(12) United States Patent
Bl et al.

(10) Patent No.: US 6,944,461 B2
(45) Date of Patent: Sep. 13, 2005

(54) COMMUNICATION SYSTEM AND METHOD FOR QUALITY-BASED CALL ADMISSION CONTROL AND SCHEDULING

(75) Inventors: Qi Bl, Morris Plains, NJ (US); Ching Yao Huang, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 486 days.

(21) Appl. No.: 10/161,528

(22) Filed: Jun. 3, 2002

(65) Prior Publication Data

US 2004/0203807 A1 Oct. 14, 2004

(51) Int. Cl.$^7$ ............................................. H04Q 7/20
(52) U.S. Cl. .................................. 455/452.2; 455/450
(58) Field of Search ................................ 455/450, 436, 455/436.3, 452.2, 452.1, 456.2, 456.5, 456.6

(56) References Cited

U.S. PATENT DOCUMENTS

| | | | | |
|---|---|---|---|---|
| 5,371,780 A | * | 12/1994 | Amitay | ....................... 455/450 |
| 5,625,875 A | * | 4/1997 | Whinnett et al. | ........... 455/513 |
| 6,353,602 B1 | * | 3/2002 | Cheng et al. | ............... 370/332 |
| 2002/0119796 A1 | * | 8/2002 | Vanghi | ....................... 455/522 |
| 2004/0110505 A1 | * | 6/2004 | Seon | .......................... 455/436 |
| 2004/0152422 A1 | * | 8/2004 | Hoglund et al. | ......... 455/67.11 |

* cited by examiner

Primary Examiner—W. R. Young
Assistant Examiner—M. Santiago-Cordero

(57) ABSTRACT

A communication system includes a base station and a plurality of remote stations wirelessly communicating with the base station. The base station determines a respective RF quality for each remote station. In response to a request for RF resources from a given remote station, the base station determines whether admission of the given remote station would exceed an RF power budget threshold. If the RF power budget threshold would not be exceeded, the RF quality is compared to a first quality threshold to determine whether to allocate the requested RF resource to the given remote station. Otherwise, the RF quality is compared to a second quality threshold more stringent than the first quality threshold to determine whether to allocate the RF resource to the given remote station. The base station may further determine whether to allocate requested RF resources on the basis of a priority of the requested resources.

20 Claims, 3 Drawing Sheets

COMMUNICATION SYSTEM AND METHOD FOR QUALITY-BASED CALL ADMISSION CONTROL AND SCHEDULING

FIELD OF THE INVENTION

The present invention relates to the field of electronic communications, and, more particularly to wireless electronic communications.

BACKGROUND OF THE INVENTION

Wireless communication is commonly carried out over a network or system that, in general, can be characterized as having a base station and a plurality of remote stations that communicate wirelessly with the base station. Although a wireless communication system is not constrained by the need for wired connections to establish and maintain communications, such a system nevertheless faces resource constraints in supporting the wireless communications of the plurality of remote stations.

A wireless system transmits data over channels within a band of frequencies (i.e., bandwidth), the channels within the band permitting the transmission of voice and/or other data. A wireless frequency band has a limited amount of bandwidth, and such systems therefore are often confronted with more potential users than can be supported simultaneously by the wireless system's frequency or spectral bandwidth capacity.

Accordingly, some manner of allocating communication resources among the plurality of remote stations is needed if the system is to transmit voice and/or other data efficiently. One approach is to allocate limited communication resources among competing users on the basis, for example, of a so-called fair algorithm. Using such an algorithm, for example, a fairer allocation of bandwidth among multiple users may be achieved than would otherwise be accomplished with first-come-first-served queuing.

In addition, there is the need to allocate available base station transmitter power to support a plurality of users of a wireless communications system. Power allocation is especially important, for example, with spread-spectrum wireless communications systems, which have the inherent characteristic that one user's spread-spectrum signal is received by another user's receiver as noise with a certain power level.

Finally, because it is possible to have more remote users than can be supported simultaneously, the power control system should also employ some form of capacity management that rejects additional users when the maximum system power level is reached. One approach to the problems is an overload control scheme intended to prevent overloading of the call processing capability of a base station in a wireless communication system. The approach entails monitoring the level at which the base station is processing calls and reducing the base station's current present hand-off rate whenever its level of call processing exceeds a first threshold, the first threshold being less than the base station's maximum call processing capacity. If the hand-off rate exceeds a second threshold, a present rate of call originations is reduced along with the reduction of the hand-off rate.

Unfortunately, in making a decision as to whether to grant a call admission request, conventional methods and devices may not decide to admit or reject new calls on the basis of whether doing so will achieve a higher throughput for the communication system. Accordingly, the overall system throughput and associated service provider revenue may suffer.

SUMMARY OF THE INVENTION

In view of the foregoing background, it is therefore an object of the present invention to enhance the average throughput of a wireless communications system constrained by limited resources.

This and other objects, features, and advantages in accordance with the present invention are provided by a communications system that, in response to a request from a remote station to a base station for call admission, determines whether to allocate RF resources by comparing the RF quality of the remote station to different thresholds according to whether admission of the remote station would exceed an RF power budget of the base station.

The base station may determine a respective radio frequency (RF) quality associated with each base station. Each remote station may send to the base station a request for the base station to allocate RF resources to the remote station. Thus, in response to a request for RF resources from a given remote station, the base station may determine whether admission of the given remote station would exceed the RF power budget threshold of the base station.

If the RF power budget threshold would not be exceeded were the base station to grant the requested RF resources to the given remote station then the RF quality of the given station may be compared to a first quality threshold in determining whether to allocate the requested RF resources. If the RF budget threshold of the base station would be exceeded, then the RF quality associated with the given remote station may be compared to a second quality threshold. The second quality threshold may be more stringent than the first, thereby taking into account the RF power budget of the base station.

Accordingly, call admission may be accepted or rejected on the basis of the RF resources that would be needed to support the call were it admitted, and on the basis of the base station's available resources to support the call. The RF resources needed to support a call, in turn, depend on the RF condition of the given remote station. Thus, it follows, that among any class of remote station users, a given remote station user experiencing poor RF conditions and needing more RF resources may accordingly be more likely to be rejected in seeking call admission.

If the given remote station is experiencing good RF conditions, conversely, the given remote station user may be more likely to receive call admission. Of course, if there are no additional RF resources available, all calls may be rejected to protect existing ones. As a result of such a proactive call admission scheme, the throughput of the communication system may be enhanced.

Additionally, in deciding whether to allocate to the given remote station the requested RF resources, the base station may further make the decision based upon a priority of the requested of RF resource. The priority of the requested resource may, for example, be based upon the application for which the RF resources are requested, such as, for example, voice communication, data transfer, video streaming, etc. Furthermore, because the data rates may vary, for example, according to a particular application, the priority of the requested RF resource may also be based upon a requested data rate. Alternately, the priority of the requested RF resource may be based upon a quality of service (QoS).

In determining the respective RF quality or condition associated with a given remote station, the base station may use a pilot report. Accordingly, the base station may transmit a pilot to any or all of the remote stations. The remote stations may respond by sending back to the base station pilot reports. The base station may thus determine the RF quality for a given remote station based upon the respective pilot report of the given remote station.

Alternatively, to permit the base station to determine a respective RF quality for a given remote station, the given remote station may transmit a pilot to the base station. The base station may then determine the respective RF quality based upon the pilot sent by the given remote station.

The base station further may comprise a controller, and an RF output amplifier that cooperates with the controller. The RF output amplifier may have a maximum RF output power, and the RF power budget threshold, therefore, may be based upon the maximum RF output power of the RF output amplifier.

The present invention further provides a method of call admission and scheduling for a wireless communications system, the wireless communications system comprising a base station and a plurality of remote stations wirelessly communicating with the base station. The method may include determining a respective RF quality for each of the plurality of remote stations and, in response to a request for RF resources from a given remote station, determining whether admission of the given remote station would exceed an RF power budget threshold.

If the RF power budget threshold would not be exceeded, then the RF quality may be compared to a first quality threshold. If, however, the RF power budget threshold would be exceeded, then the RF quality may be compared to a second quality threshold that is more stringent than the first. Determining whether to allocate the RF resources may additionally be based upon a priority of the requested RF resource.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and the prime notation indicates similar elements in alternate embodiments.

Figure 1:
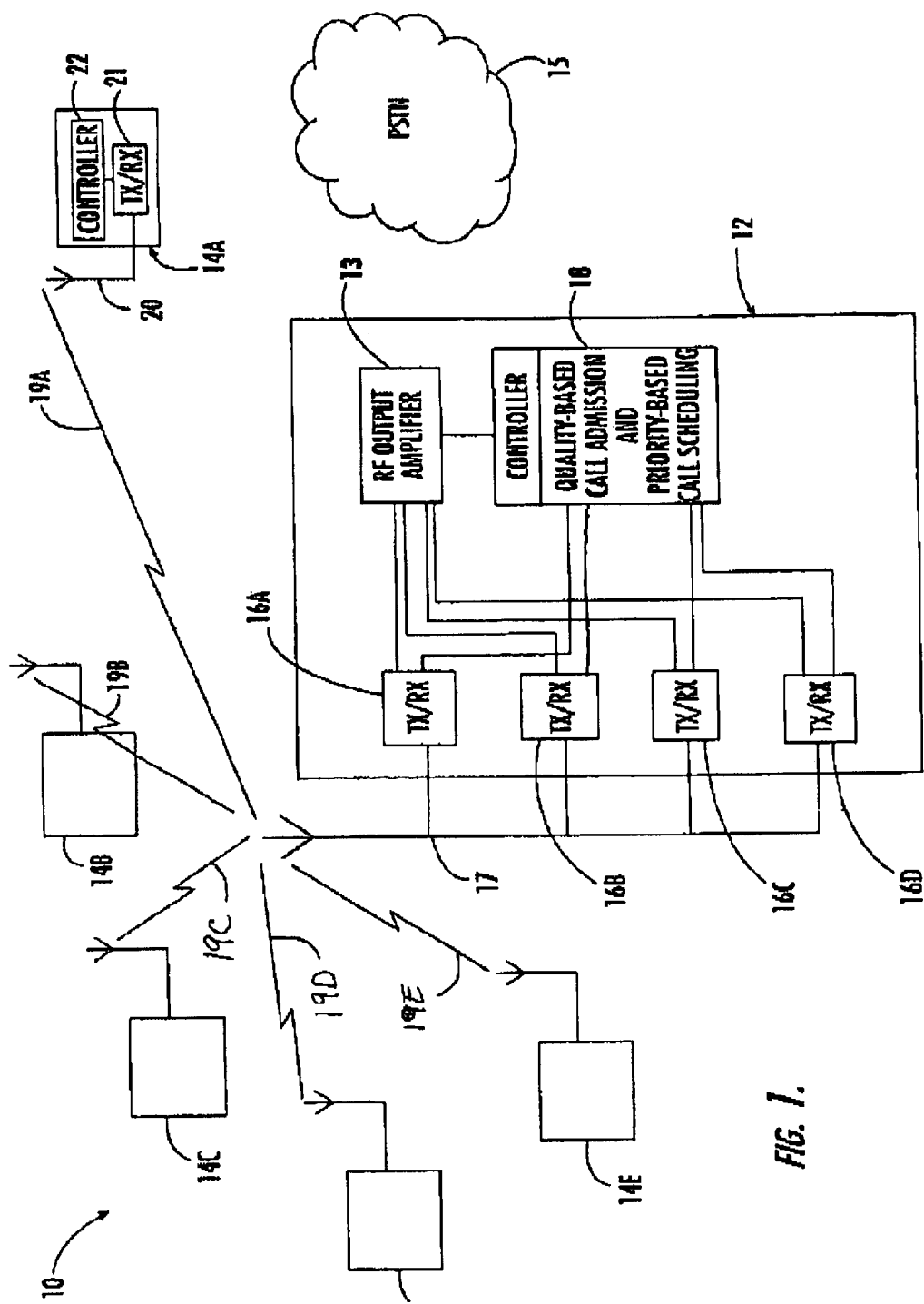
FIG. 1 is a schematic diagram of a wireless communications system in accordance with the invention.

Referring initially to FIG. 1, a communications system 10 according to the invention is described. The communications system 10 includes a base station 12 and a plurality of remote stations 14A–14E, each of which communicates wirelessly with the base station. The base station 12 illustratively comprises a plurality of transceivers 16A–16D, an antenna 17 connected to each transceiver, and a controller 18 connected with and controlling each of the transceivers. The controller 18, as described more fully below, may implement quality-based call admission to support a requested call admission associated with a remote station 14A–14E.

Illustratively, the base station 12 further comprises an RF output amplifier 13 connected to the controller 18, as will be readily understood by one skilled in the art. The controller 18, moreover, is illustratively connected to a public switched telephone network (PSTN) 15, as will also be readily understood by one skilled in the art.

The remote stations 14A–14E are substantially similar to one another. It suffices, therefore, to describe a single remote station 14A. In particular, a given remote station 14A comprises an antenna 20, a transceiver 21 connected to the antenna 20, and a controller 22 connected to the transceiver 21. Each of the plurality of remote stations 14A–14E communicates with the base station 12 via a respective signal path 19A–19E.

Figure 2:
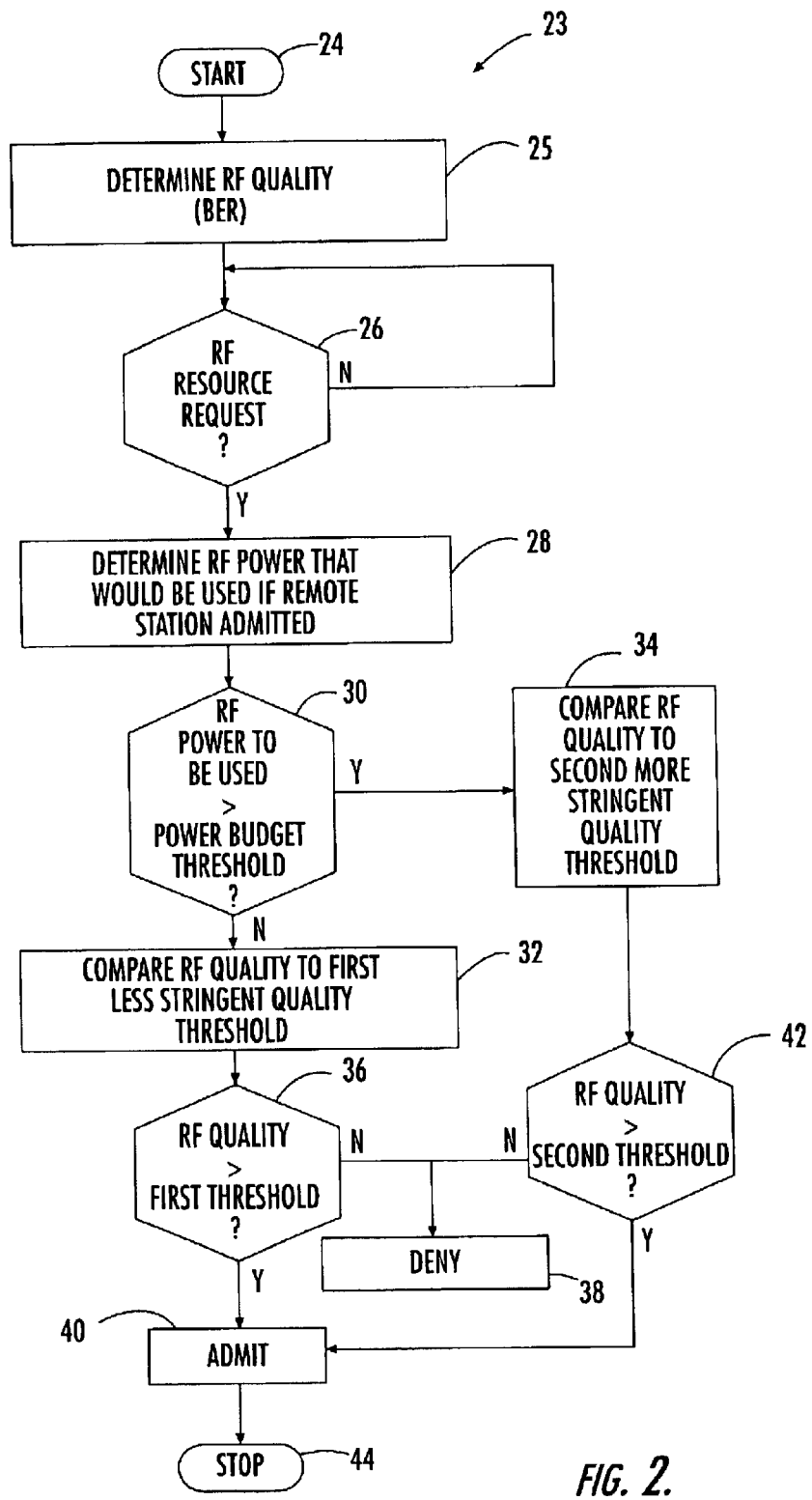
FIG. 2 is a flow chart implemented by the communications system of FIG. 1.

Referring additionally to FIG. 2, a manner in which the communications system 10 conducts communications is described. The base station 12 at Block 25, following the start (Block 24), determines an RF quality for each remote station 14A–14E. As will be readily understood by one skilled in the art, the respective RF quality associated with a given remote station 14A is one factor determining the communication resources to be allocated by the base station 12 to support a call associated with the given remote station. For example, in terms of power, the base station 12 will have to allocate greater power the worse the RF quality or condition of the signal path of the remote station 14A.

Upon the base station 12 receiving a request from a given remote station 14A for RF resources (Block 26), the RF power that would be used were the given remote station admitted is determined at Block 28. As explained below, this determination, in turn, is used to determine which of two quality thresholds will be used in deciding whether to admit the given remote station 14A given the RF quality associated with the given remote station as determined by the base station 12.

The determination whether to allocate the RF resources requested by the given remote station 14A is made in the context of the base station's available resources, namely, the base station's power budget. As will be understood by those skilled in the art, the level of the base station's available resources in terms of power is a function of such factors as the number of remote station calls being supported at an instant in time, the applications for which the various calls are being supported (e.g. voice communication, data transfer, etc.), and the RF quality associated with corresponding remote stations for which the various calls are being supported.

For example, with more calls being supported, more of the power of the base station 12 is being used. Furthermore, certain applications such as, for example, video streaming as opposed to, for example, voice communication or data transfer require more of the power of the base station 12.

Accordingly, after determining at Block 28 the RF power that would be used if the given remote station 14A requesting admission (i.e., an allocation of resources) were admitted, the RF power that would be used is compared at Block 30 to the RF power budget threshold of the base station 12. If the RF power that would be used does not exceed the RF power budget threshold, a first, less stringent quality threshold (Block 32) is selected for determining whether to allocate the requested resources. If the RF power budget threshold would be exceeded, however, the base station 12 chooses a second quality threshold (Block 34) that poses a more stringent admission requirement at Block 34. The RF power budget threshold could typically be set at some percentage of the maximum output of the output amplifier. For example, the RF power budget threshold could be set at 60 to 80% of the maximum.

If the first, less stringent quality threshold is used, the base station 12 at Block 36 determines whether to allocate the resources requested by the given remote station 14A by comparing the RF quality, already determined for the given remote station by the base station, with the first quality threshold. If the RF quality of the given remote station 14A is insufficient in the sense of not meeting the selected threshold, the requested resources are denied (Block 38). Otherwise, if the RF quality of the given remote station 14A is sufficient to satisfy the selected threshold, the requested resources are allocated to the remote station at Block 40. In other words, the given remote station 14A is admitted.

Alternately, if at Block 30 it is determined that the RF power that would be used by admitting the given remote station 14A would exceed the RF power budget threshold of the base station 12, then, as noted above, the second more stringent threshold is used in deciding whether to admit the given remote station. Accordingly, at Block 42 the RF quality associated with the given remote station 14A is compared to the second, more stringent threshold. If the RF quality is sufficient, the given remote station 14A is admitted at Block 40, but if the RF quality is insufficient, call admission is denied (Block 38).

The RF quality thresholds could be based upon received bit error rates (BER), for example. Because a higher BER indicates a poorer RF condition, RF quality is inversely related to the BER. Thus, while illustratively, the determination whether to allocate RF resources to the given remote station 14A depends on whether the RF quality exceeds a quality threshold, those skilled in the art will readily appreciate that other decision criteria can be efficiently used. For example, the decision may be based upon whether a BER associated with a given remote station is greater or less than a threshold. In the former case, because a high BER corresponds to poor RF quality, the resources would be denied, whereas if the BER were below the threshold, resources would be allocated to the given remote station 14A.

In a more general context, once the RF power budget threshold is exceeded, weaker remote stations are not admitted, while stronger remote stations are admitted, thereby increasing throughput. In other words, by the base station 12 allocating constrained RF resources to those remote stations 14A–14E having relatively better RF quality, the communication system 10 is able, on average, to achieve increased system throughput, notwithstanding the constrained power budget of the base station. Further, because a communications service provider's revenue is typically a function of communications system throughput, the communications system 10 is thus likely not only to increase system throughput but also a service provider's revenue as well.

Figure 3:
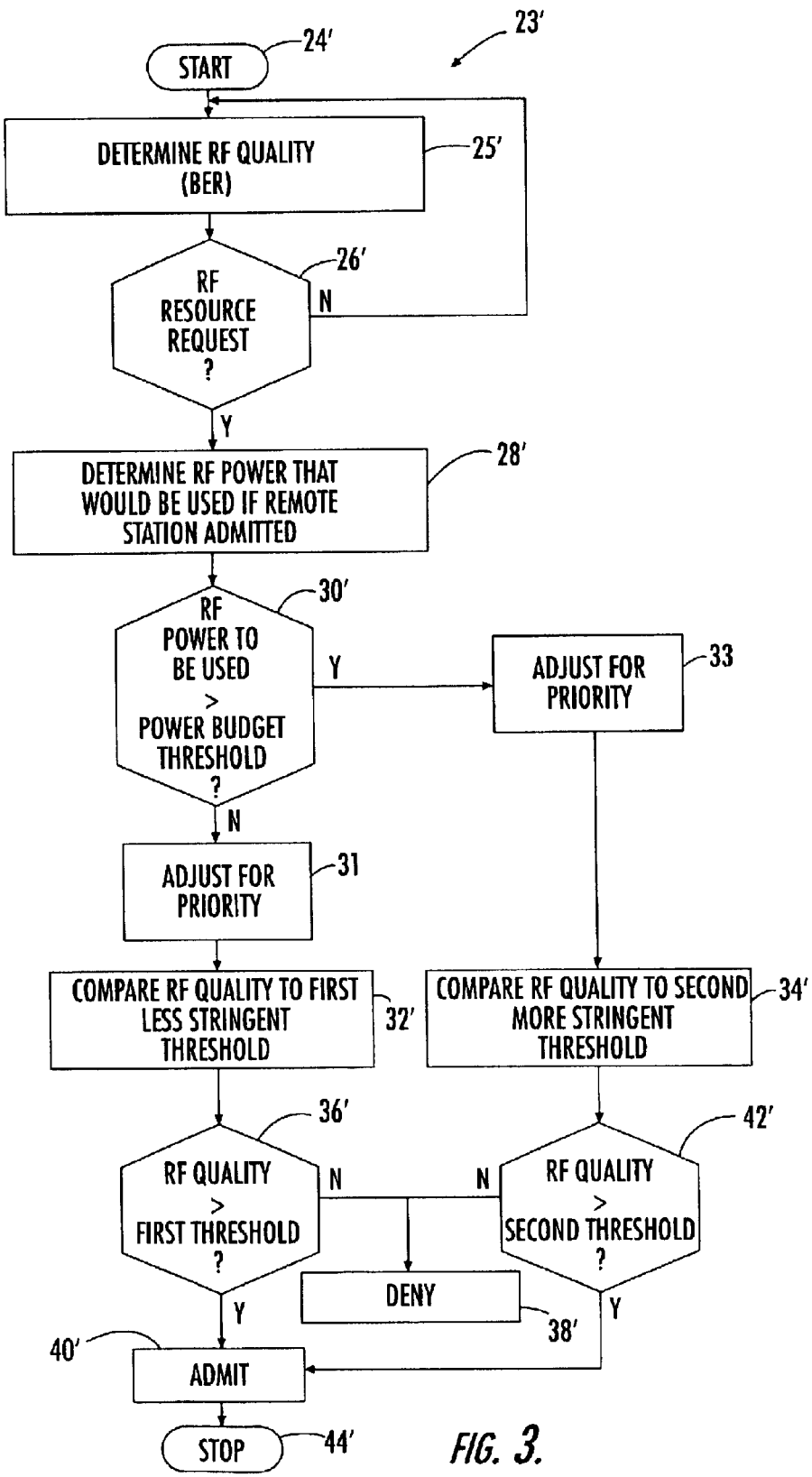
FIG. 3 is an alternate flow chart implemented by the communications system of FIG. 1.

Referring now additionally to FIG. 3, the base station 12 further may determine whether to allocate RF resources requested by a given remote station 14A based upon a priority of the requested RF resource. Illustratively, an adjustment for priority is made at Blocks 31 and 33, depending, respectively, downstream of the decision at Block 30'. The adjustment, as illustrated, is made to the RF quality associated with the given remote station 14A. As will be readily appreciated by those skilled in the art, however, other priority adjustment schemes can be used. For example, the first, less stringent, and the second, more stringent, thresholds may instead be adjusted to reflect a priority of the requested RF resource. Also, the adjustment could be made to the power budget threshold itself.

The priority of the requested RF resource includes, for example, a priority based upon a desired application for which resources are requested by the given remote station 14A. As already noted, a call may be requested in order to run a video streaming application, for example. Such an application likely requires greater RF resources than, for example, voice communication or data transfers. Accordingly, in order to enhance throughput of the communication system 10, an adjustment can made corresponding to a lower priority being assigned to particular applications that require more resources to support and a higher priority being assigned to those requiring fewer resources to support. Relatedly, the priority of the requested RF resource can be based upon the data rate requested for a particular call by the given remote station 14A.

Still further, the priority of the requested RF resource may be based upon a quality of service (QoS). The QoS, for example, may correspond to the payment scheme under which the given remote station 14A obtains service from the base station 12 supporting the communications system 10. According to this embodiment, those remote stations that pay premiums for service are accorded higher priorities relative to other remote stations. Therefore, as between two remote stations vying for the resources of the base station 12, if one is accorded a higher priority by virtue of paying a premium. By admitting and scheduling calls on the basis of premiums paid, the communication system 10 is further able to enhance the revenues earned by a service provider.

In determining the RF quality for a given remote station, the base station transmits a pilot via the signal path 19A to the remote stations 14A–14E, as will be readily understood by those skilled in the art. In response thereto, the remote stations 14A–14E send back to the base station 12 respective pilot reports, on the basis of which the base station determines the respective RF quality of each remote station.

Alternately, as will also be readily understood by those skilled in the art, the remote stations 14A–14E each transmit respective pilots to the base station 12. The base station 12 determines the RF quality for a given remote station 14A based on the pilot received from the given remote station. Accordingly, as illustrated in Blocks 25 and 26, the base station 12 is able to determine the respective RF quality of each of the remote stations 14A–14E on an on-going basis.

The present invention further provides a method of call admission and scheduling for a wireless communications system 10 comprising a base station 12 and a plurality of remote stations 14A–14E, each wirelessly communicating with the base station. A respective RF quality for each of the plurality of remote stations 14A–4E is determined, and, in response to a request for RF resources from a given remote station 14A, a determination is made whether to admit the given remote station, the determination based upon an assessment of whether admitting the remote station would exceed an RF power budget threshold.

If the RF power budget threshold would not be exceeded, then the RF quality is compared to a first quality threshold. If, however, the RF power budget threshold would be exceeded, then the RF quality is compared to a second quality threshold, the second quality threshold imposing a more stringent requirement than the first. Determining whether to allocate the RF resources to the given remote station 14A may additionally be based upon a priority of the requested RF resource.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A base station for communicating with remote stations, said base comprising:

a controller for determining a respective RF quality for each remote station; and upon receiving a request for RF resources from a given remote station, determining whether admission of the given remote station would exceed an RF power budget threshold, and if the RF power budget threshold would not be exceeded then comparing the RF quality to a first quality threshold to determine whether to allocate the requested RF resource to the given remote station, and if the RF power budget threshold would be exceeded then comparing the RF quality to a second quality threshold more stringent than the first quality threshold to determine whether to allocate the RF resource to the given remote station.

2. A base station according to claim 1 wherein said base station further determines whether to allocate the requested RF resource to the given remote station based upon a priority of the requested RF resource.

3. A base station according to claim 2 wherein the priority of the requested RF resource is based upon a requested data rate.

4. A base station according to claim 2 wherein the priority of the requested RF resource is based upon a desired application.

5. A base station according to claim 2 wherein the priority of the requested RF resource is based upon a quality of service (QoS).

6. A base station according to claim 1 wherein said base station further comprises at least one transceiver connected to said controller to transmit a pilot to said remote stations and, in response thereto, receive respective pilot reports from said remote stations; and wherein said base station determines the RF quality for the given remote station based upon the pilot report therefrom.

7. A base station according to claim 1 wherein said base station further comprises at least one transceiver connected to said controller to receive pilots transmitted by respective remote stations; and wherein said base station determines the RF quality for the given remote station based upon the pilot therefrom.

8. A base station according to claim 1 wherein said base station comprises an RF output amplifier cooperating with said controller and having a maximum RF output power; and wherein the RF power budget threshold is based on the maximum RF output power of said RF output amplifier.

9. A wireless communication system comprising:

a base station; and a plurality of remote stations, each sending a request for allocation of radio frequency (RF) resources to said base station;

said base station for determining a respective RF quality for each remote station, and upon receiving a request for RF resources from a given remote station, determining whether admission of the given remote station would exceed an RF power budget threshold, and if the RF power budget threshold would not be exceeded then comparing the RF quality to a first quality threshold to determine whether to allocate the requested RF resource to the given remote station, and if the RF power budget threshold would be exceeded then comparing the RF quality to a second quality threshold more stringent than the first quality threshold to determine whether to allocate the RF resource to the given remote station.

10. A wireless communication system according to claim 9 wherein said base station further determines whether to allocate the requested RF resource to the given remote station based upon a priority of the requested RF resource, the priority being based on at least one of a requested data rate, a desired application, and a quality of service (QoS).

11. A wireless communication system according to claim 9 wherein said base station transmits a pilot to said remote stations;

wherein said remote stations send respective pilot reports back to said base station; and wherein said base station determines the RF quality for the given remote station based upon the pilot report therefrom.

12. A wireless communication system according to claim 9 wherein said remote stations transmit respective pilots to said base station; and wherein said base station determines the RF quality for the given remote station based upon the pilot therefrom.

13. A method of call admission and scheduling for a wireless communications system comprising a base station and a plurality of remote stations wirelessly communicating therewith, the method comprising:

determining a respective RF quality for each of the plurality of remote stations; and responding to a request from a given remote station to the base station for RF resources by determining whether admission of the given remote station would exceed an RF power budget threshold of the base station, comparing the RF quality to a first quality threshold to determine whether to allocate the requested RF resource to the remote station when the RF power budget threshold would not be exceeded, and comparing the RF quality to a second quality threshold more stringent than the first quality threshold to determine whether to allocate the RF resource to the given remote station when the RF power budget threshold would be exceeded.

14. A method according to claim 13 further comprising determining whether to allocate the RF resources based upon a priority of the requested RF resource.

15. A method according to claim 14 wherein the priority of the requested resource is based upon a requested data rate.

16. A method according to claim 14 wherein the priority of the requested RF resource is based upon a desired application.

17. A method according to claim 14 wherein the priority of the requested RF resource is based upon a quality of service (QoS).

18. A method according to claim 13 wherein determining a respective RF quality for each of the plurality of remote stations comprises:

transmitting a pilot from the base station to the remote stations; and sending respective pilot reports from the remote stations back to the base station;

the base station determining the RF quality for a given remote station based upon the pilot report therefrom.

19. A method according to claim 13 wherein determining a respective RF quality for each of the plurality of remote stations comprises transmitting respective pilots from the remote stations to the base station, the base station determining the RF quality for a given remote station based upon the pilot therefrom.

20. A method according to claim 13 wherein the RF power budget threshold is based on a maximum RF output power of an RF output amplifier associated with the base station.

* * * * *